(12) United States Patent
Yazawa

(10) Patent No.: US 12,345,265 B2
(45) Date of Patent: Jul. 1, 2025

(54) PUMP APPARATUS

(71) Applicant: NIDEC INSTRUMENTS CORPORATION, Nagano (JP)

(72) Inventor: Takehiko Yazawa, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 18/751,333

(22) Filed: Jun. 23, 2024

(65) Prior Publication Data

US 2025/0003412 A1  Jan. 2, 2025

(30) Foreign Application Priority Data

Jun. 27, 2023 (JP) .................. 2023-104661

(51) Int. Cl.
| | |
|---|---|
| F04D 13/06 | (2006.01) |
| B29C 45/00 | (2006.01) |
| B29C 45/26 | (2006.01) |
| F04D 29/18 | (2006.01) |
| F04D 29/22 | (2006.01) |
| F04D 29/28 | (2006.01) |
| F04D 29/44 | (2006.01) |
| F04D 29/54 | (2006.01) |
| H02K 7/14 | (2006.01) |

(52) U.S. Cl.
CPC ......... *F04D 13/06* (2013.01); *F04D 29/2222* (2013.01); *H02K 7/14* (2013.01); *B29C 2045/0029* (2013.01); *B29C 2045/2671* (2013.01); *F04D 29/185* (2013.01); *F04D 29/288* (2013.01); *F04D 29/44* (2013.01); *F04D 29/54* (2013.01); *F04D 29/547* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,296,459 | B1 * | 10/2001 | Saputo | F04D 17/164 417/244 |
| 2004/0062648 | A1 * | 4/2004 | Makinson | F04D 25/0653 416/241 A |
| 2008/0304986 | A1 * | 12/2008 | Kenyon | H02K 7/14 417/423.12 |
| 2014/0044575 | A1 * | 2/2014 | Naffziger | B29C 45/00 417/423.1 |
| 2020/0309137 | A1 * | 10/2020 | Kuriger | F04D 29/4246 |
| 2022/0049704 | A1 * | 2/2022 | Kurz | F04D 29/023 |
| 2022/0186732 | A1 * | 6/2022 | McSheery | H02K 7/14 |

FOREIGN PATENT DOCUMENTS

CN   115833416   3/2023

* cited by examiner

*Primary Examiner* — Binh Q Tran
(74) *Attorney, Agent, or Firm* — JCIPRNET

(57) ABSTRACT

In this pump apparatus, each of plural gate marks formed in a second blade member is formed at an intermediate position in a circumferential direction of a rotor between two blades that are adjacent to each other in the circumferential direction of the rotor, and the even number of blades are disposed between the gate marks in the circumferential direction of the rotor. The plural gate marks are disposed on an outer side, in the radial direction of the rotor, of an outer circumferential surface of a portion, which is connected to the second blade member, in a magnet holding member formed in a tubular shape.

12 Claims, 5 Drawing Sheets

PUMP APPARATUS

CROSS-REFERENCE TO RELATED APPLICATION

This application claims the priority benefit of Japan application no. 2023-104661, filed on Jun. 27, 2023. The entirety of the above-mentioned patent application is hereby incorporated by reference herein and made a part of this specification.

BACKGROUND

Field of the Invention

An at least an embodiment of the present invention relates to a pump apparatus including an impeller and a motor that rotates the impeller.

Description of the Related Documents

Conventionally, a pump apparatus that includes an impeller disposed in a pump chamber and a motor for rotationally driving the impeller has been known (see Chinese Patent Application Publication No. 115833416, for example). In the pump apparatus described in Chinese Patent Application Publication No. 115833416, the motor includes a rotor and a stator that is disposed on an outer circumferential side of the rotor. The rotor includes a drive magnet and a cylindrical holding section in which the drive magnet is embedded by insert molding. The impeller is formed of a resin. The impeller includes a plurality of blades, a lid section with which the blades are integrally formed, and a base section formed separately from the blades and the lid section. The base section is integrally formed with the holding section by injection molding. End surfaces on the base section side of the plurality of blades are fixed to the base section by ultrasonic welding.

The present inventor has developed a pump apparatus that includes an impeller disposed in a pump chamber and a motor for rotating the impeller. In this pump apparatus, a rotor includes a magnet holding member that is made of a resin, and a drive magnet is attached to an outer circumferential side of the magnet holding member. The magnet holding member is formed in a substantially cylindrical shape, for example. The impeller includes: a first blade member which is made of the resin and has a plurality of blades; and a second blade member, which is made of a resin, which is formed separately from the first blade member, and to which the first blade member is fixed. Similar to the pump apparatus described in Chinese Patent Application Publication No. 115833416, the second blade member is integrally formed with the magnet holding member by injection molding. The second blade member is formed in a flange shape that expands outward in a radial direction of the rotor from an end of the magnet holding member.

In regard to the pump apparatus under development, the present inventor has examined to fix end portions on the second blade member side of the plurality of blades to the second blade member by welding or the like, similarly to the pump apparatus described in Chinese Patent Application Publication No. 115833416. The present inventor has also examined to provide a gate to the second blade member side of a mold that is used to manufacture the second blade member and the magnet holding member by integral molding. In this case, inappropriate setting of a gate position possibly leads to formation of a fragile weld in a portion of the second blade member, to which the blades are fixed. In addition, the formation of the weld in the portion of the second blade member, to which the blades are fixed, possibly leads to a defect such as a reduction in fixation strength between the blade and the second blade member.

In view of the above, an object of at least an embodiment of the present invention is to provide a pump apparatus that includes an impeller having: a first blade member made of a resin and formed with a plurality of blades; and a second blade member formed separately from the first blade member and to which the plurality of blades is fixed, and that can suppress formation of a weld in a portion of the second blade member, to which the blades are fixed.

SUMMARY

A pump apparatus according to at least an embodiment of the present invention includes: a motor having a rotor and a stator; and an impeller that rotates with the rotor, in which the rotor includes a tubular drive magnet and a tubular magnet holding member that is made of a resin, the drive magnet being attached to an outer circumferential side of the magnet holding member, the impeller includes: a first blade member that is made of a resin and has an even number of four or more blades arranged at a constant pitch in a circumferential direction of the rotor; and a second blade member that is made of a resin, that is formed separately from the first blade member, and to which the first blade member is fixed, an axial direction of the magnet holding member that is formed in the tubular shape matches an axial direction of the rotor, when one side in the axial direction of the rotor is set as a first direction side, and an opposite side from the first direction side is set as a second direction side, the second blade member is integrally formed with the magnet holding member by injection molding, and is formed in a flange shape that expands outward in a radial direction of the rotor from a first direction end of the magnet holding member, a plurality of the blades is fixed to the first direction side of the second blade member, a plurality of gate marks is formed on a surface on the first direction side of the second blade member, the plurality of gate marks being disposed on an outer side of an outer circumferential surface of a portion, which is connected to the second blade member, in the magnet holding member in the radial direction of the rotor and being arranged in the circumferential direction of the rotor, each of the plural gate marks is formed at an intermediate position in the circumferential direction of the rotor between the two blades that are adjacent to each other in the circumferential direction of the rotor, and an even number of the blades are disposed between the gate marks in the circumferential direction of the rotor.

In the pump apparatus according to at least an embodiment of the present invention, each of the plural gate marks, which are formed on the surface on the first direction side of the second blade member, is formed at the intermediate position in the circumferential direction of the rotor between the two blades that are adjacent to each other in the circumferential direction of the rotor, and the even number of the blades are disposed between the gate marks in the circumferential direction of the rotor. Thus, in at least an embodiment of the present invention, it is possible to suppress formation of a weld in a portion of the second blade member, to which the blade is fixed. In the present specification, the "intermediate position in the circumferential direction of the rotor between the two blades that are adjacent to each other in the circumferential direction of the rotor" includes: a center position (perfect center position) in the circumferential direction of the rotor between the two blades that are adjacent to each other in the circumferential direction of the rotor; and a substantially center position that is slightly shifted from the center position in the circumferential direction of the rotor between the two blades that are adjacent to each other in the circumferential direction of the rotor.

In at least an embodiment of the present invention, the plurality of the gate marks, which is formed on the surface on the first direction side of the second blade member, is disposed on the outer side of the outer circumferential surface of the portion, which is connected to the second blade member, in the magnet holding member in the radial direction of the rotor. Accordingly, in at least an embodiment of the present invention, when the magnet holding member and the second blade member are integrally manufactured by injection molding, the resin immediately after flowing in from each mold gate only flows in the radial direction of the rotor. This enables simplification of a flow of the resin to be formed on the second blade member. As a result, the flow of the resin to be formed on the second blade member is controlled easily.

Thus, in at least an embodiment of the present invention, when the magnet holding member and the second blade member are integrally manufactured by injection molding, it is possible to control the flow of the resin such that a weld is formed in a portion of the second blade member away from a portion thereof, to which the blade is fixed. Therefore, in at least an embodiment of the present invention, it is possible to effectively suppress the formation of the weld in the portion of the second blade member, to which the blade is fixed.

In at least an embodiment of the present invention, the plurality of the gate marks is preferably formed at the same position in the radial direction of the rotor. With such a configuration, the flow of the resin to be formed on the second blade member is further simplified, and the flow of the resin to be formed on the second blade member is controlled further easily. Therefore, it is possible to further effectively suppress the formation of the weld in the portion of the second blade member, to which the blade is fixed.

In at least an embodiment of the present invention, the plurality of the gate marks is each preferably formed at an intermediate position of the second blade member in the radial direction of the rotor. With such a configuration, it is possible to reduce a distance, for which the resin to be formed on the second blade member flows in the radial direction of the rotor. This enables the further simplification of the flow of the resin to be formed on the second blade member, and the flow of the resin to be formed on the second blade member is controlled further easily. As a result, it is possible to further effectively suppress the formation of the weld in the portion of the second blade member, to which the blade is fixed. In the present specification, the "intermediate position of the second blade member in the radial direction of the rotor" includes: a center position (perfect center position) of the second blade member in the radial direction of the rotor; and a substantially center position of the second blade member in the radial direction of the rotor that is slightly shifted from the center position thereof.

In at least an embodiment of the present invention, the plurality of the gate marks is preferably formed at a constant pitch in the circumferential direction of the rotor. In this case, the second blade member is preferably formed with the gate marks, a number of which is half the number of the blades provided to the first blade member. With such a configuration, it is possible to form the second blade member that is uniform in the circumferential direction of the rotor. In addition, in this case, the first blade member includes the 10 blades, and the second blade member is formed with the 5 gate marks, for example.

In at least an embodiment of the present invention, the surface on the first direction side of the second blade member is preferably formed with groove sections, into each of which an end portion on the second direction side of respective one of the plural blades is fitted, and in a range on an outer side of the gate marks in the radial direction of the rotor, the end portion on the second direction side of each of the blades is preferably fixed to the respective groove section by welding. A fluid pressure that is applied to an outer circumferential portion of the impeller is higher than a fluid pressure that is applied to an inner circumferential portion of the impeller. With such a configuration, it is possible to increase fixation strength between the blade and the second blade member in the outer circumferential portion of the impeller. Therefore, even when the fluid pressure that is applied to the outer circumferential portion of the impeller is increased, it is possible to prevent detachment of the blade from the second blade member.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

As it has been described so far, in at least an embodiment of the present invention, it is possible to suppress the formation of the weld in the portion of the second blade member, to which the blade is fixed, in the pump apparatus that includes the impeller having the first blade member, which is formed of the resin and formed with the plurality of the blades, and the second blade member, which is made of the resin, is formed separately from the first blade member, and to which the plurality of the blades is fixed Hereinafter, an embodiment of the present invention will be described with reference to the drawings.

Overall Configuration of Pump Apparatus

Figure 1:
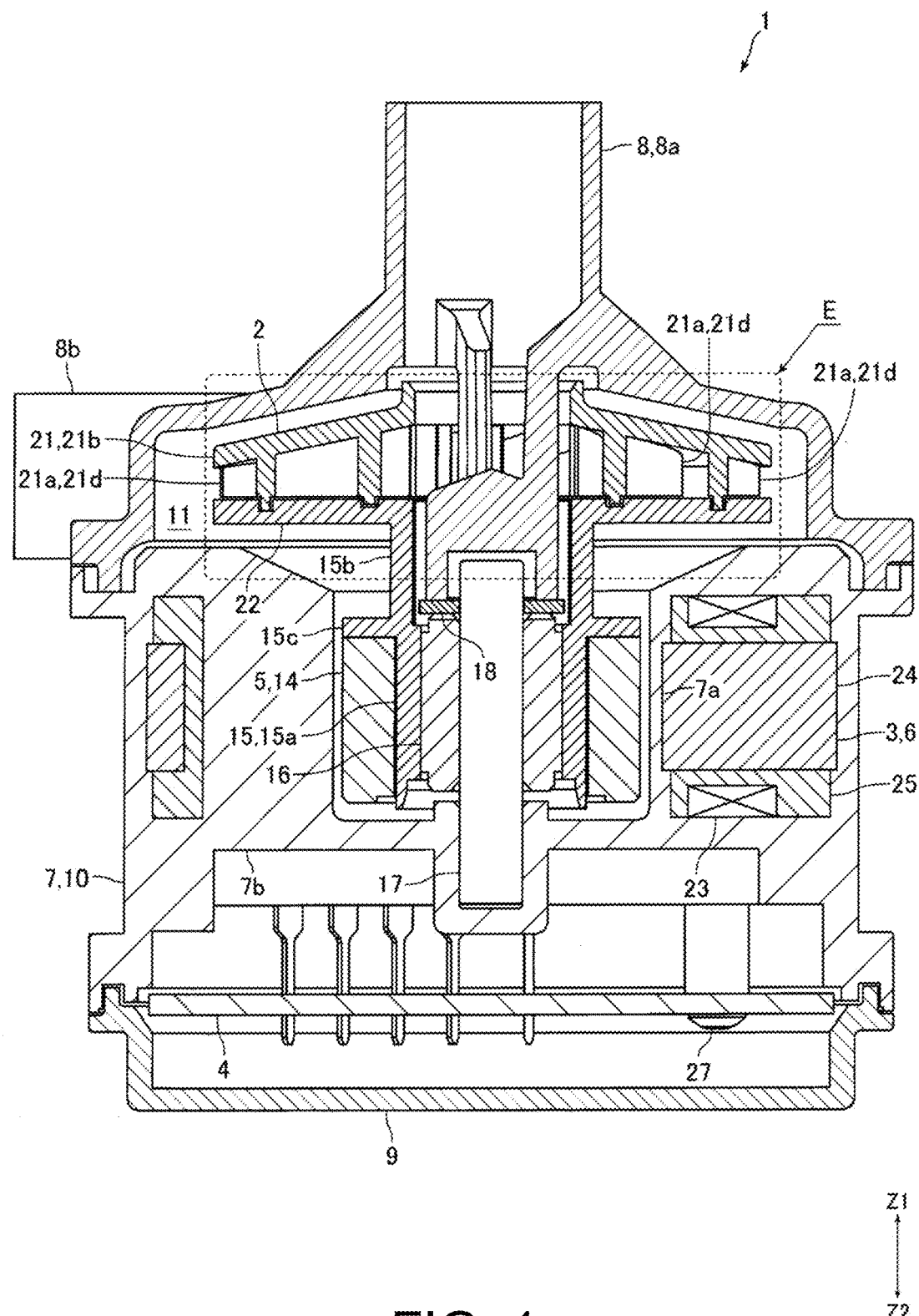
FIG. 1 is a cross-sectional view of a pump apparatus according to an embodiment of the present invention.

FIG. 1 is a cross-sectional view of a pump apparatus 1 according to the embodiment of the present invention. In the following description, a Z1 direction side is defined as an "upper" side in FIG. 1 and the like, and a Z2 direction side as an opposite side to the upper side is defined as a "lower" side in FIG. 1 and the like.

The pump apparatus 1 in the present embodiment is a type of a pump referred to as a canned pump (canned motor pump), and is used to circulate a cooling fluid, for example. The pump apparatus 1 includes an impeller 2, a motor 3 that rotates the impeller 2, and a circuit board 4 for control of the motor 3. The motor 3 includes a rotor 5 and a stator 6. The impeller 2, the motor 3, and the circuit board 4 are disposed in a case body 10 having a housing 7, a case 8 that covers the housing 7 from above, and a cover 9 that covers the housing 7 from below.

Each of the housing 7, the case 8, and the cover 9 is formed of a resin. The case 8 is joined to an upper end of the housing 7 by ultrasonic welding, and the cover 9 is joined to a lower end of the housing 7 by ultrasonic welding. The case 8 is formed with a fluid suction section 8a and a fluid discharge section 8b. A pump chamber 11 is formed in the case body 10. Through the pump chamber 11, the fluid that is suctioned from the suction section 8a flows toward the discharge section 8b. The pump chamber 11 is defined by the housing 7 and the case 8. In the pump apparatus 1, the fluid is suctioned from the upper side of the pump apparatus 1, and the fluid is discharged in an orthogonal direction to an up-down direction.

The rotor 5 includes a tubular drive magnet 14, a magnet holding member 15 that holds the drive magnet 14, and a tubular sleeve 16 held by the magnet holding member 15. The drive magnet 14 and the sleeve 16 are each formed in a cylindrical shape. The magnet holding member 15 is formed in a tubular shape. More specifically, the magnet holding member 15 is formed in a substantially cylindrical shape. An axial direction of the drive magnet 14, an axial direction of the magnet holding member 15, and an axial direction of the sleeve 16 match the up-down direction. The drive magnet 14 is attached to an outer circumferential side of the magnet holding member 15, and the sleeve 16 is attached to an inner circumferential side of the magnet holding member 15. A specific configuration of the magnet holding member 15 will be described below.

The rotor 5 is rotatably supported by a fixed shaft 17. The fixed shaft 17 is disposed such that an axial direction of the fixed shaft 17 matches the up-down direction. In other words, the up-down direction is an axial direction of the rotor 5. An upper end portion of the fixed shaft 17 is held by the case 8, and a lower end portion of the fixed shaft 17 is held by the housing 7. The fixed shaft 17 is inserted through an inner circumferential side of the sleeve 16. A thrust bearing member 18 is attached to the fixed shaft 17, and is in contact with an upper end surface of the sleeve 16. In the present embodiment, the sleeve 16 functions as a radial bearing of the rotor 5, and the sleeve 16 and the thrust bearing member 18 function as a thrust bearing of the rotor 5. In the present embodiment, the upper side (Z1 direction side) is a first direction side as one side in the axial direction of the rotor 5, and the lower side (Z2 direction side) is a second direction side as an opposite side to the first direction side.

The impeller 2 is disposed above the rotor 5. The impeller 2 rotates with the rotor 5. The impeller 2 and the rotor 5 are disposed in the pump chamber 11. The impeller 2 includes: a first blade member 21 which has a plurality of blades 21a arranged at a constant pitch in a circumferential direction of the rotor 5; and a second blade member 22 which is formed separately from the first blade member 21 and to which the first blade member 21 is fixed. The impeller 2 in the present embodiment is configured by the first blade member 21 and the second blade member 22. A specific configuration of the impeller 2 will be described below.

The stator 6 is formed in a substantially cylindrical shape as a whole. The stator 6 is disposed on the outer circumferential side of the rotor 5. The stator 6 is also disposed such that the axial direction of the stator 6 matches the up-down direction. In other words, the up-down direction is the axial direction of the stator 6. The stator 6 includes a drive coil 23, a stator core 24, and an insulator 25.

The stator core 24 includes an outer circumferential ring section formed in a ring shape and a plurality of salient pole sections, each of which projects inward in a radial direction of the rotor 5 from the outer circumferential ring section. A tip surface (inner surface in the radial direction of the rotor 5) of each of the salient pole sections opposes an outer circumferential surface of the drive magnet 14 via a cylindrical section 7a, which is described below and constitutes a part of the housing 7. The insulator 25 is formed of an insulating material such as a resin. The drive coil 23 is wound around each of the salient pole sections of the stator core 24 via the insulator 25.

As described above, the housing 7 is formed of the resin. The housing 7 is integrally formed with the stator 6 to cover the drive coil 23, the stator core 24, and the insulator 25. In the present embodiment, the housing 7 is integrally molded with the stator 6 by insert molding. The housing 7 includes the cylindrical section 7a and a bottom section 7b. The cylindrical section 7a has a cylindrical shape and is disposed between the tip surface of each of the salient pole sections of the stator core 24 and the outer circumferential surface of the drive magnet 14. The bottom section 7b closes a lower end of the cylindrical section 7a. The circuit board 4 is disposed under the bottom section 7b.

The circuit board 4 is a rigid board such as a glass epoxy board, and is formed in a flat board shape. The circuit board 4 is disposed such that a thickness direction of the circuit board 4 matches the up-down direction.

The circuit board 4 is also disposed outside the pump chamber 11. The circuit board 4 is fixed to the housing 7 with a fixing screw 27. The drive coil 23 is electrically connected to the circuit board 4. The housing 7 has a function of preventing the fluid in the pump chamber 11 from flowing into portions where the stator 6 and the circuit board 4 are disposed. The cover 9 is fixed to the lower end of the housing 7 in a manner to cover the circuit board 4 from below.

Configurations of Magnet Holding Member and Impeller

Figure 2:
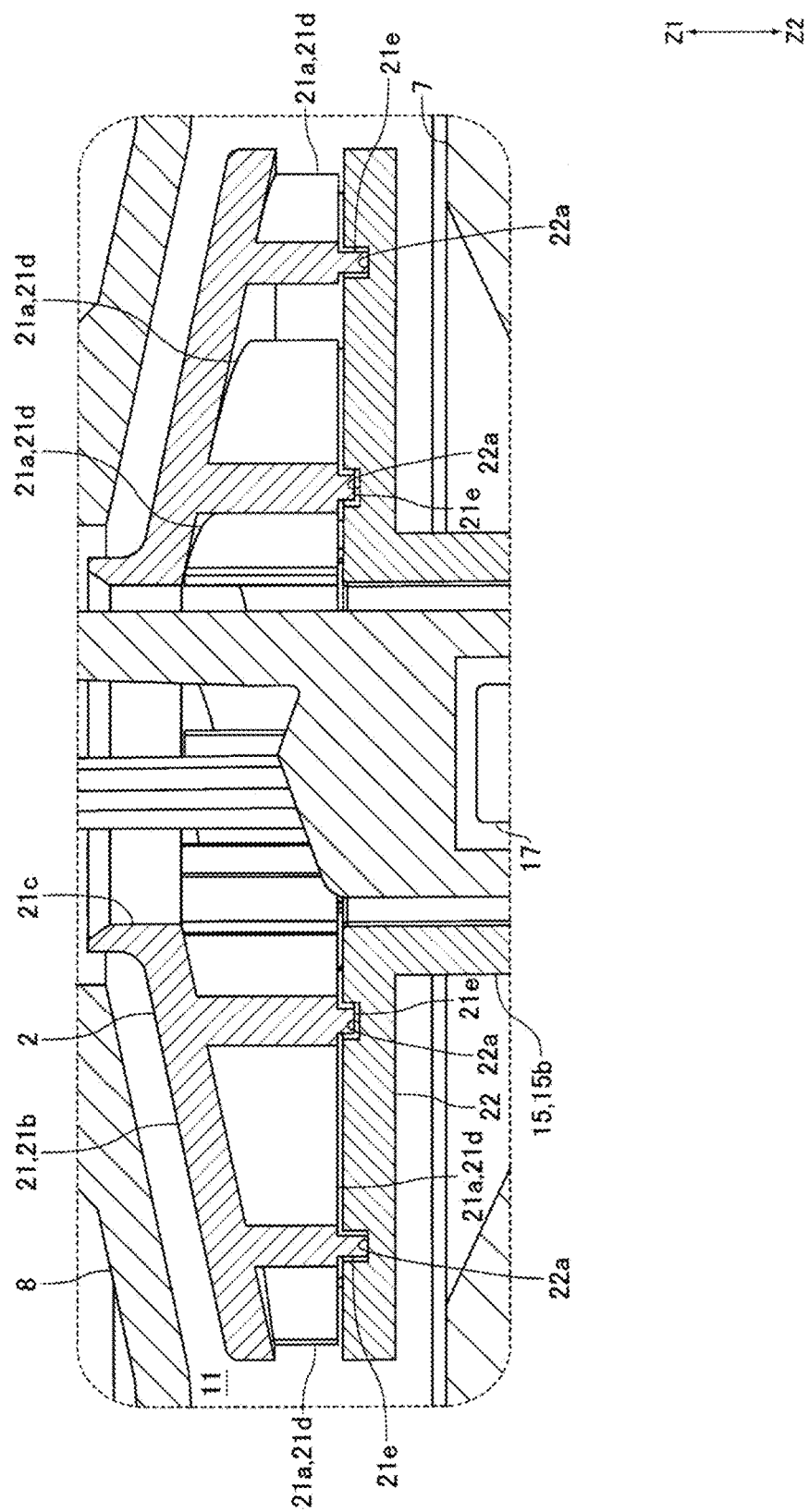
FIG. 2 is an enlarged view of a section E in FIG. 1.
Figure 3:
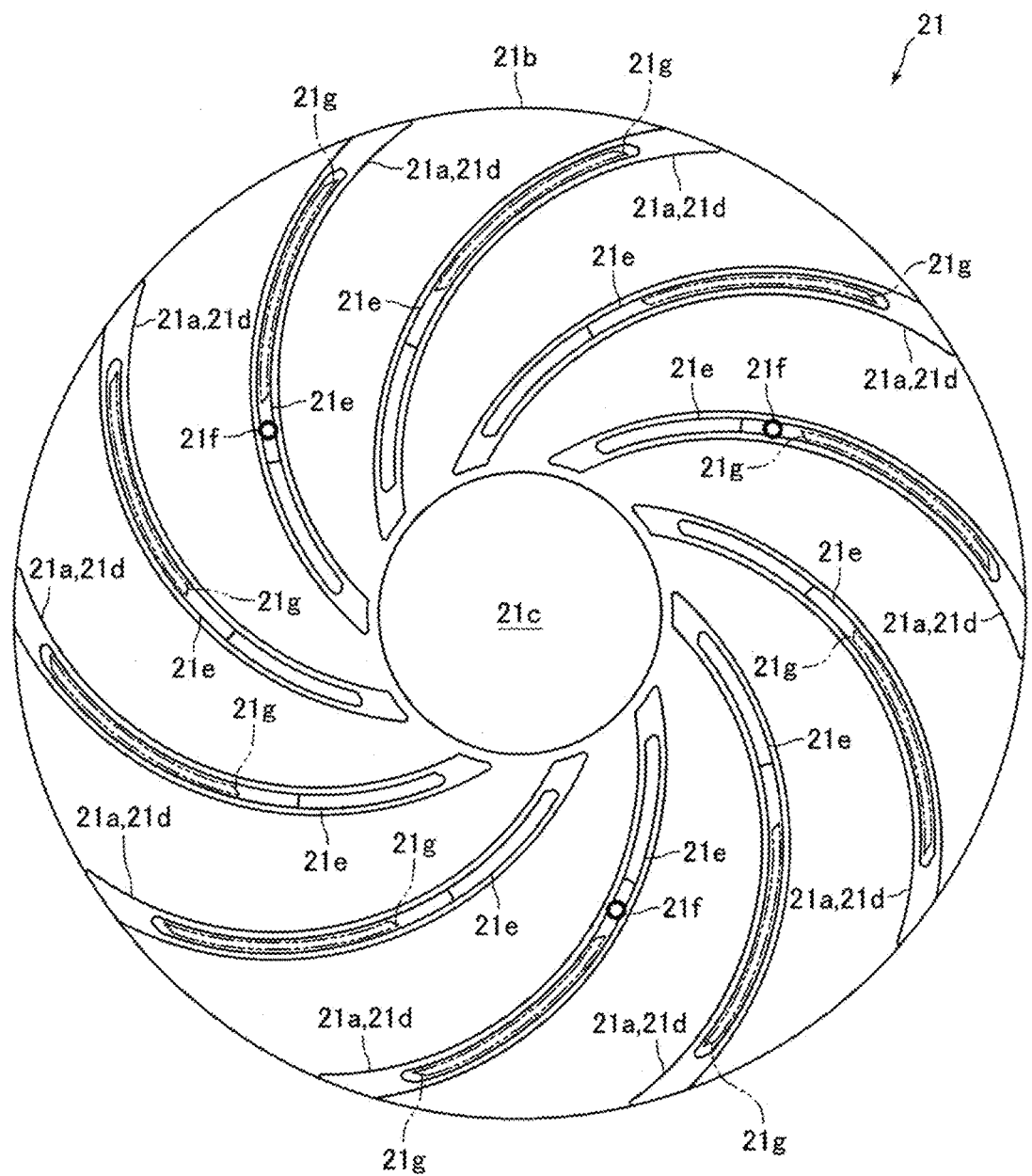
FIG. 3 is a bottom view of a first blade member illustrated in FIG. 1.
Figure 4:
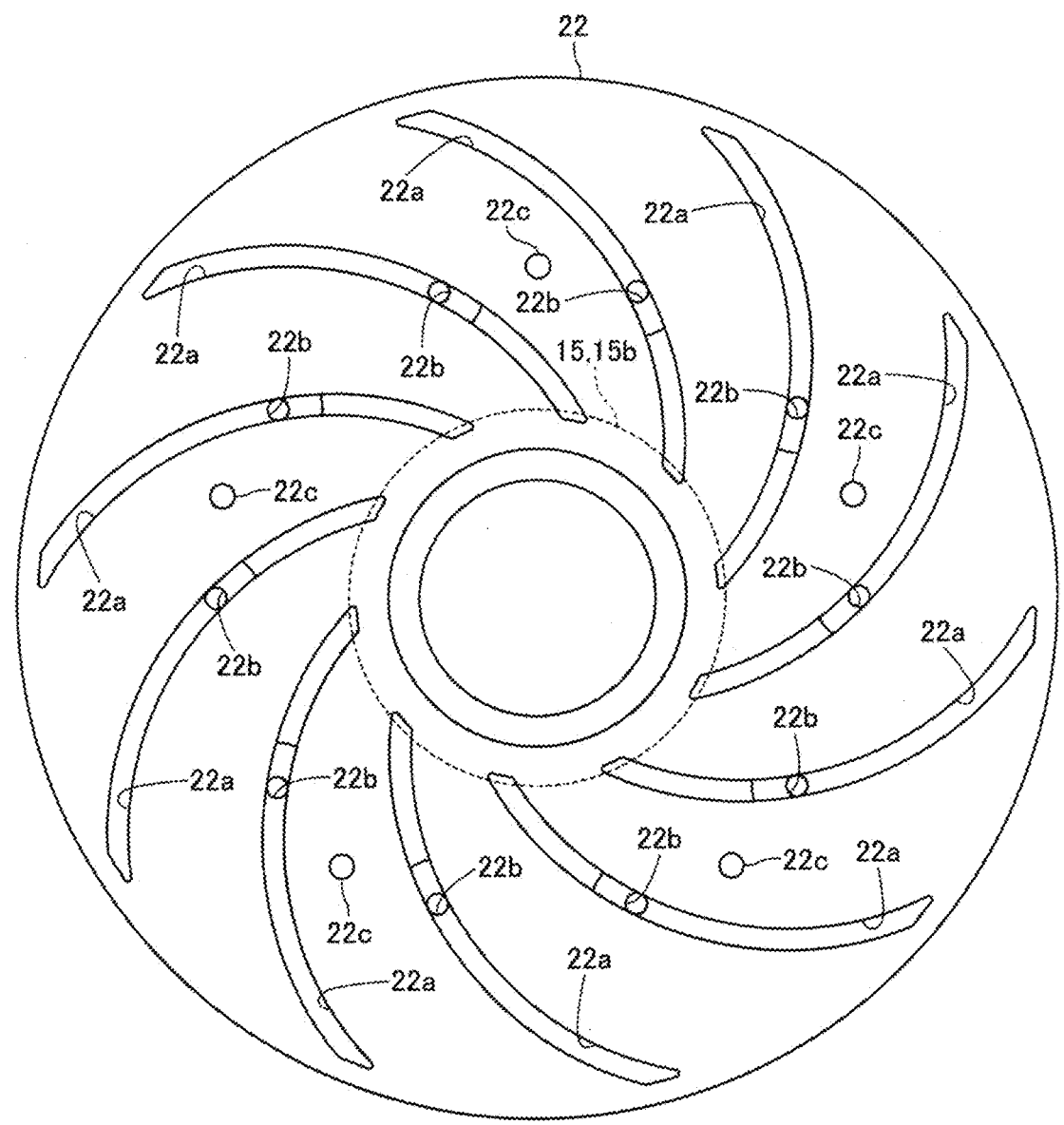
FIG. 4 is a plan view of a second blade member and a magnet holding member illustrated in FIG. 1.

FIG. 2 is an enlarged view of a section E in FIG. 1. FIG. 3 is a bottom view of the first blade member 21 illustrated in FIG. 1. FIG. 4 is a plan view of the second blade member 22 and the magnet holding member 15 illustrated in FIG. 1.

The magnet holding member 15 is formed of a resin. As described above, the magnet holding member 15 is formed in the substantially cylindrical shape. The magnet holding member 15 includes a first tubular section 15a that constitutes a lower portion of the magnet holding member 15, a second tubular section 15b that constitutes an upper portion of the magnet holding member 15, and a flange section 15c that is disposed between the first tubular section 15a and the second tubular section 15b in the up-down direction. The magnet holding member 15 in the present embodiment is configured by the first tubular section 15a, the second tubular section 15b, and the flange section 15c.

The first tubular section 15a and the second tubular section 15b are each formed in a cylindrical shape. An inner diameter of the second tubular section 15b is larger than an inner diameter of the first tubular section 15a. An outer diameter of the second tubular section 15b is larger than an outer diameter of the first tubular section 15a. The flange section 15c is formed in a flange shape that extends outward in the radial direction of the rotor 5. The flange section 15c is also formed in an annular shape. An outer diameter of the flange section 15*c* is larger than the outer diameter of the second tubular section 15*b*.

The drive magnet 14 is disposed on an outer circumferential side of the first tubular section 15*a*. An upper end surface of the drive magnet 14 is in contact with a lower surface of the flange section 15*c*. The drive magnet 14 is fixed to the first tubular section 15*a* by adhesion, for example. The sleeve 16 is disposed on an inner circumferential side of the first tubular section 15*a*. The sleeve 16 is integrally formed with the first tubular section 15*a* by insert molding, for example. On an inner circumferential side of the second tubular section 15*b*, a portion of the case 8, which holds the upper end portion of the fixed shaft 17, and the like are disposed. Here, the drive magnet 14 may integrally be formed with the first tubular section 15*a* by insert molding.

As described above, the impeller 2 is configured by the first blade member 21 and the second blade member 22. The first blade member 21 is fixed to an upper side of the second blade member 22. The first blade member 21 is formed of a resin. The first blade member 21 includes the plurality of blades 21*a* and a top plate section 21*b*, to which an upper end of each of the plural blades 21*a* is connected. The first blade member 21 includes the even number of, more specifically, four or more blades 21*a*. The first blade member 21 in the present embodiment includes the 10 blades 21*a*. A center portion of the top plate section 21*b* is formed with a through hole 21*c*, through which the fluid suctioned from the suction section 8*a* flows.

The 10 blades 21*a* are arranged on an outer circumferential side of the through hole 21*c*. In addition, as described above, the 10 blades 21*a* are arranged at the constant pitch in the circumferential direction of the rotor 5. Each of the blades 21*a* projects downward from the top plate section 21*b*. When seen in the up-down direction, each of the blades 21*a* has a curved shape. For example, each of the blades 21*a* has an arc shape when seen in the up-down direction. Each of the blades 21*a* includes: a blade main body 21*d* that is connected to the top plate section 21*b* and applies a centrifugal force to the fluid; and a projecting section 21*e* that projects downward from the blade main body 21*d*.

An outer shape of the projecting section 21*e* is smaller than an outer shape of the blade main body 21*d*. The projecting section 21*e* constitutes a lower end portion of the blade 21*a*. The projecting section 21*e* is disposed in a groove section 22*a*, which is described below and is formed in the second blade member 22. Of the 10 blades 21*a*, the 3 blades 21*a* are each formed with a positioning pin 21*f* for positioning the first blade member 21 with respect to the second blade member 22 in the orthogonal direction to the up-down direction (see FIG. 3). The positioning pin 21*f* projects downward from the projecting section 21*e*.

The second blade member 22 is formed of a resin. In addition, the second blade member 22 is integrally formed with the magnet holding member 15 by injection molding. In other words, the magnet holding member 15 and the second blade member 22 are integrally molded as a single resin component. The second blade member 22 is formed in a flange shape that expands outward in the radial direction of the rotor 5 from an upper end of the magnet holding member 15.

In other words, the second blade member 22 is formed in the flange shape that expands outward in the radial direction of the rotor 5 from an upper end of the second tubular section 15*b*, and the upper end of the second tubular section 15*b* is connected to the second blade member 22. The second blade member 22 is formed in an annular flat plate shape. A thickness direction of the second blade member 22 matches the up-down direction. An outer diameter of the second blade member 22 is larger than an outer diameter of the flange section 15*c* of the magnet holding member 15.

The groove section 22*a*, into which the projecting section 21*e* of respective one of the 10 blades 21*a* is fitted, is formed on an upper surface of the second blade member 22. That is, the 10 groove sections 22*a* are formed on the upper surface of the second blade member 22. Each of the groove sections 22*a* is recessed downward. A shape of each of the groove sections 22*a* corresponds to a shape of the projecting section 21*e*, and is a curved shape when seen in the up-down direction. A positioning hole 22*b*, in which a positioning pin 21*f* is inserted, is formed in each of the groove sections 22*a*. The positioning hole 22*b* is recessed downward from a bottom surface of the respective groove section 22*a*.

A plurality of gate marks (gate traces) 22*c* is also formed on the upper surface of the second blade member 22. Each of the gate marks 22*c* is a mark of an inlet for the resin (that is, a mark of a mold gate) that has been used when the magnet holding member 15 and the second blade member 22 are integrally molded by injection molding using the mold. In other words, the mold for integral molding of the magnet holding member 15 and the second blade member 22 is formed with a plurality of the gates at positions corresponding to the upper surface of the second blade member 22. When the magnet holding member 15 and the second blade member 22 are integrally molded, the resin flows into the mold from a position on an upper side of the second blade member 22. The plurality of the gate marks 22*c* is arranged in the circumferential direction of the rotor 5.

In the present embodiment, the five gate marks 22*c* are formed on the upper surface of the second blade member 22. That is, the number of the gate marks 22*c*, which are formed on the upper surface of the second blade member 22, is half the number of the blades 21*a* provided to the first blade member 21. The five gate marks 22*c* are formed at a constant pitch in the circumferential direction of the rotor 5. In addition, the five gate marks 22*c* are formed at the same position in the radial direction of the rotor 5.

As illustrated in FIG. 4, each of the five gate marks 22*c* is formed at an intermediate position in the circumferential direction of the rotor 5 between the two groove sections 22*a* that are adjacent to each other in the circumferential direction of the rotor 5. In other words, each of the five gate marks 22*c* is formed at an intermediate position in the circumferential direction of the rotor 5 between the two blades 21*a* that are adjacent to each other in the circumferential direction of the rotor 5. In the present embodiment, each of the five gate marks 22*c* is formed at a center position in the circumferential direction of the rotor 5 between the two blades 21*a* that are adjacent to each other in the circumferential direction of the rotor 5. The two groove sections 22*a* are disposed between the gate marks 22*c* in the circumferential direction of the rotor 5 (that is, in the circumferential direction of the rotor 5 between the two groove sections 22*a* that are adjacent to each other in the circumferential direction of the rotor 5). In other words, the two blades 21*a* (the even number of the blades 21*a*) are disposed between the gate marks 22*c* in the circumferential direction of the rotor 5.

Each of the five gate marks 22*c* is disposed on an outer side of the outer circumferential surface of the second tubular section 15*b* in the radial direction of the rotor 5 (see FIG. 4). That is, each of the five gate marks 22*c* is disposed on the outer side of an outer circumferential surface of a portion of the magnet holding member 15, which is connected to the second blade member 22, in the radial direction of the rotor 5. In addition, each of the five gate marks 22c is formed at the intermediate position of the second blade member 22 in the radial direction of the rotor 5. More specifically, each of the five gate marks 22c is formed at a center position of the second blade member 22 in the radial direction of the rotor 5.

The 10 blades 21a are fixed to the upper surface side of the second blade member 22. More specifically, the projecting section 21e, which is fitted into the groove section 22a, is joined and fixed to the groove section 22a by welding such as ultrasonic welding. A projection 21g for welding is formed on the projecting section 21e before being fixed to the groove section 22a (see FIG. 3). The projection 21g projects downward from a lower surface of the projecting section 21e. In the present embodiment, in a range on the outer side of the gate mark 22c in the radial direction of the rotor 5, the projecting section 21e is fixed to the groove section 22a by welding. Accordingly, the projection 21g is formed in the range on the outer side of the gate mark 22c in the radial direction of the rotor 5. The resin, which is melted during welding of the projecting section 21e to the groove section 22a, is accumulated in the groove section 22a. The groove section 22a has a function to prevent adhesion of the resin, which is solidified after being melted during welding, to the upper surface of the second blade member 22.

Main Effects of Present Embodiment

As it has been described so far, in the present embodiment, the projecting section 21e, which is the lower end portion of the blade 21a, is fixed into the groove section 22a of the second blade member 22. In addition, in the present embodiment, each of the five gate marks 22c, which are formed on the upper surface of the second blade member 22, is formed at the intermediate position in the circumferential direction of the rotor 5 between the two groove sections 22a, which are adjacent to each other in the circumferential direction of the rotor 5. The two groove sections 22a are disposed between the gate marks 22c in the circumferential direction of the rotor 5. For this reason, in the present embodiment, a weld is easily formed between the groove sections 22a in the circumferential direction of the rotor 5. In other words, in the present embodiment, a weld is less likely to be formed in a portion (that is, the groove section 22a) of the second blade member 22, to which the blade 21a is fixed. Therefore, in the present embodiment, it is possible to suppress formation of the weld in the portion of the second blade member 22, to which the blade 21a is fixed.

In the present embodiment, the five gate marks 22c are disposed on the outer side of the outer circumferential surface of the second tubular section 15b in the radial direction of the rotor 5. Accordingly, in the present embodiment, when the magnet holding member 15 and the second blade member 22 are integrally manufactured by injection molding, the resin immediately after flowing in from each of the mold gates only flows in the radial direction of the rotor 5. This enables simplification of the flow of the resin to be formed on the second blade member 22. As a result, the flow of the resin to be formed on the second blade member 22 is controlled easily. For this reason, in the present embodiment, when the magnet holding member 15 and the second blade member 22 are integrally manufactured by injection molding, the flow of the resin can be controlled such that the weld is formed in a portion of the second blade member 22 away from a portion thereof, to which the blade 21a is fixed. Therefore, in the present embodiment, it is possible to effectively suppress the formation of the weld in the portion of the second blade member 22, to which the blade 21a is fixed.

Here, in the case where the five gate marks 22c are disposed on an inner side of the outer circumferential surface of the second tubular section 15b in the radial direction of the rotor 5, the resin immediately after flowing in from each of the mold gates flows in the radial direction and the axial direction of the rotor 5 when the magnet holding member 15 and the second blade member 22 are integrally manufactured by injection molding. This complicates the flow of the resin to be formed on the second blade member 22.

For this reason, in this case, it becomes difficult to control the flow of the resin to be formed on the second blade member 22. As a result, when the magnet holding member 15 and the second blade member 22 are integrally manufactured by injection molding, it becomes difficult to control the flow of the resin such that the weld is formed in the portion of the second blade member 22 away from the portion thereof, to which the blade 21a is fixed.

In the present embodiment, the five gate marks 22c are formed at the same position in the radial direction of the rotor 5. Thus, in the present embodiment, the flow of the resin to be formed on the second blade member 22 is further simplified, and the flow of the resin to be formed on the second blade member 22 is thereby controlled further easily. Therefore, in the present embodiment, it is possible to further effectively suppress the formation of the weld in the portion of the second blade member 22, to which the blade 21a is fixed.

In the present embodiment, each of the five gate marks 22c is formed at the intermediate position of the second blade member 22 in the radial direction of the rotor 5. Accordingly, in the present embodiment, it is possible to reduce a distance, for which the resin to be formed on the second blade member 22 flows in the radial direction of the rotor 5. Thus, in the present embodiment, the flow of the resin to be formed on the second blade member 22 is simplified, and the flow of the resin to be formed on the second blade member 22 is controlled further easily. As a result, in the present embodiment, it is possible to further effectively suppress the formation of the weld in the portion of the second blade member 22, to which the blade 21a is fixed.

In the present embodiment, a fluid pressure that is applied to an outer circumferential portion of the impeller 2 is higher than a fluid pressure that is applied to an inner circumferential portion of the impeller 2. However, in the range on the outer side of the gate mark 22c in the radial direction of the rotor 5, the projecting section 21e, which is the lower end portion of the blade 21a, is fixed to the groove section 22a by welding. Thus, it is possible to increase fixation strength between the blade 21a and the second blade member 22 in the outer circumferential portion of the impeller 2. Therefore, in the present embodiment, even when the fluid pressure that is applied to the outer circumferential portion of the impeller 2 is increased, it is possible to prevent detachment of the blade 21a from the second blade member 22.

Other Embodiments

The above-described embodiment is an example of the preferred embodiment of the present invention. However, at least an embodiment of the present invention is not limited thereto, and various modifications may be made thereto without changing the gist of at least an embodiment of the present invention.

Figure 5A:
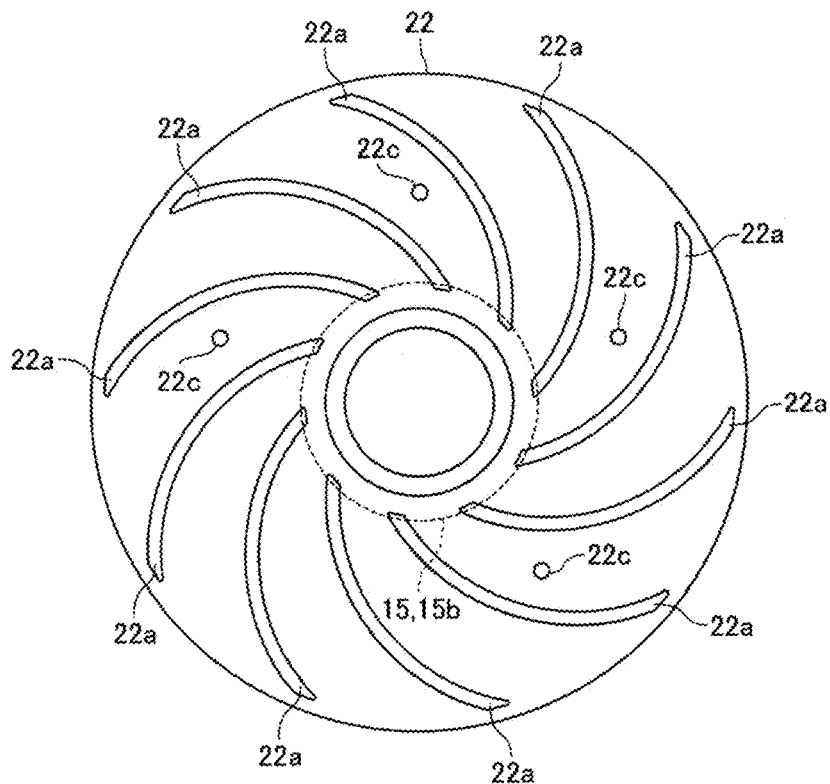
FIGS. 5A and 5B are plan views, each of which illustrates a second blade member and a magnet holding member according to another embodiment of the present invention.

In the above-described embodiment, four or less of the plural gate marks 22c may be formed on the upper surface of the second blade member 22. For example, as illustrated in FIG. 5A, the four gate marks 22c may be formed on the upper surface of the second blade member 22. In this case, the four gate marks 22c are not formed at the constant pitch in the circumferential direction of the rotor 5. There is a portion in which the two blades 21a are disposed between the gate marks 22c in the circumferential direction of the rotor 5, and there is also a portion in which the four blades 21a are disposed between the gate marks 22c in the circumferential direction of the rotor 5. In FIG. 5A, the positioning holes 22b and the like are not illustrated.

In the above embodiment, the number of the blades 21a provided to the first blade member 21 may be the even number that is 12 or more. For example, the 12 blades 21a may be provided to the first blade member 21. In this case, for example, the six gate marks 22c are formed at a constant pitch in the circumferential direction of the rotor 5, and the two blades 21a are disposed between two each of the gate marks 22c in the circumferential direction of the rotor 5.

Figure 5B:
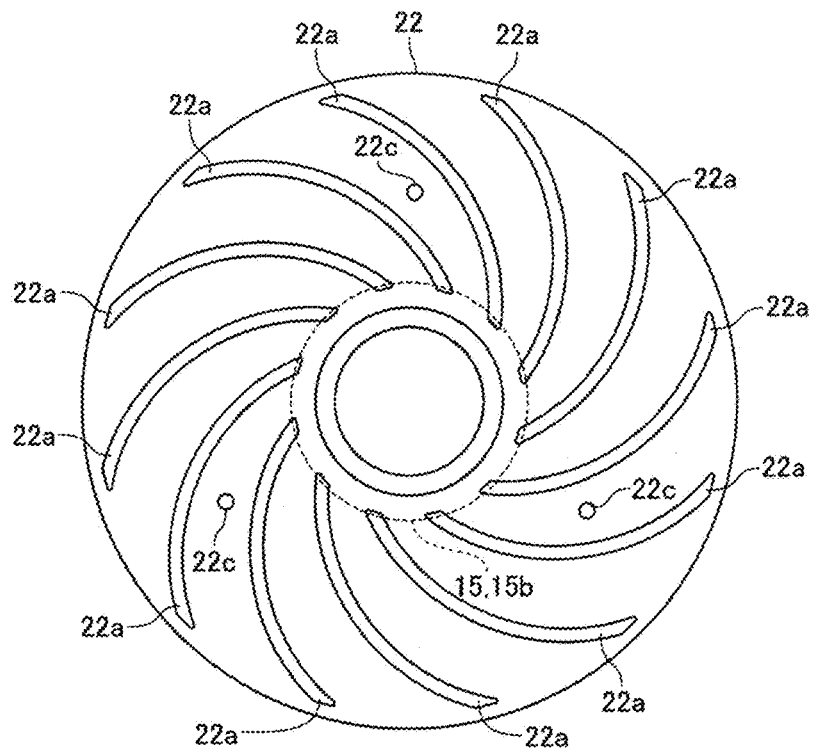

In addition, in this case, as illustrated in FIG. 5B, the three gate marks 22c may be formed on the upper surface of the second blade member 22. The three gate marks 22c are formed at a constant pitch in the circumferential direction of the rotor 5, and the four blades 21a are disposed between two each of the gate marks 22c in the circumferential direction of the rotor 5. Also, in this case, the weld is easily formed between the groove sections 22a in the circumferential direction of the rotor 5. Therefore, it is possible to suppress the formation of the weld in the portion of the second blade member 22, to which the blade 21a is fixed. In FIG. 5B, the positioning holes 22b and the like are not illustrated.

In the above-described embodiment, the number of the blades 21a provided to the first blade member 21 may be four, six, or eight. For example, in the case where the six blades 21a are provided to the first blade member 21, the three gate marks 22c are formed at the constant pitch in the circumferential direction of the rotor 5, and the two blades 21a are disposed between the gate marks 22c in the circumferential direction of the rotor 5. In the case where the eight blades 21a are provided to the first blade member 21, the four gate marks 22c may be formed at a constant pitch in the circumferential direction of the rotor 5, and the two blades 21a may be disposed between two each of the gate marks 22c in the circumferential direction of the rotor 5. Alternatively, the two gate marks 22c may be formed at a 180° pitch in the circumferential direction of the rotor 5, and the four blades 21a may be disposed between the gate marks 22c in the circumferential direction of the rotor 5.

In the above-described embodiment, each of the gate marks 22c may be formed at a substantially center position that is slightly shifted from the center position of the second blade member 22 in the radial direction of the rotor 5. Alternatively, each of the gate marks 22c may be formed at a position that is shifted from the intermediate position of the second blade member 22 in the radial direction of the rotor 5. In other words, each of the gate marks 22c may be formed at a position that is significantly shifted from the center position of the second blade member 22 in the radial direction of the rotor 5. In the above-described embodiment, the five gate marks 22c may not be formed at the same position in the radial direction of the rotor 5.

In the above-described embodiment, each of the five gate marks 22c may be formed at a substantially center position between the two blades 21a that are adjacent to each other in the circumferential direction of the rotor 5, and the substantially center position is slightly shifted from the center position therebetween in the circumferential direction of the rotor 5. In addition, in the above-described embodiment, each of the blades 21a may have a linear shape when seen in the up-down direction. That is, the 10 blades 21a may be formed radially. Furthermore, in the above-described embodiment, the groove sections 22a may not be formed on the upper surface of the second blade member 22.

Configuration of Present Technique

The present technique can be configured as follows.

(1) A pump apparatus includes: a motor having a rotor and a stator; and an impeller that rotates with the rotor,
  the rotor includes a tubular drive magnet and a tubular magnet holding member that is made of a resin, the drive magnet being attached to an outer circumferential side of the magnet holding member,
  the impeller includes: a first blade member that is made of a resin and has an even number of four or more blades arranged at a constant pitch in a circumferential direction of the rotor; and a second blade member that is made of a resin, that is formed separately from the first blade member, and to which the first blade member is fixed, an axial direction of the magnet holding member that is formed in the tubular shape matches an axial direction of the rotor,
  when one side in the axial direction of the rotor is set as a first direction side, and an opposite side from the first direction side is set as a second direction side,
  the second blade member is integrally formed with the magnet holding member by injection molding, and is formed in a flange shape that expands outward in a radial direction of the rotor from a first direction end of the magnet holding member,
  a plurality of the blades is fixed to the first direction side of the second blade member,
  a plurality of gate marks is formed on a surface on the first direction side of the second blade member, the plurality of gate marks being disposed on an outer side of an outer circumferential surface of a portion, which is connected to the second blade member, in the magnet holding member in the radial direction of the rotor and being arranged in the circumferential direction of the rotor,
  each of the plural gate marks is formed at an intermediate position in the circumferential direction of the rotor between two of the blades that are adjacent to each other in the circumferential direction of the rotor, and
  an even number of the blades are disposed between the gate marks in the circumferential direction of the rotor.

(2) The pump apparatus according to (1), in which the plurality of the gate marks is formed at the same position in the radial direction of the rotor.

(3) The pump apparatus according to (1) or (2), in which the plurality of the gate marks is each formed at an intermediate position of the second blade member in the radial direction of the rotor.

(4) The pump apparatus according to any one of (1) to (3), in which the plurality of the gate marks is formed at a constant pitch in the circumferential direction of the rotor.

(5) The pump apparatus according to (4), in which the second blade member is formed with the gate marks, a number of which is half the number of the blades provided to the first blade member.

(6) The pump apparatus according to (5), in which the first blade member includes the blades in a quantity of 10 blades, and the second blade member is formed with the gate marks in a quantity of 5 gate marks.

(7) The pump apparatus according to any one of (1) to (6), in which the surface on the first direction side of the second blade member is formed with groove sections, into each of which an end portion on the second direction side of respective one of the plural blades is fitted, and in a range on an outer side of the gate marks in the radial direction of the rotor, the end portion on the second direction side of each of the blades is fixed to the respective groove section by welding.

What is claimed is:

1. A pump apparatus comprising:
a motor having a rotor and a stator; and
an impeller that rotates with the rotor, wherein
the rotor includes a tubular drive magnet and a tubular magnet holding member that is made of a resin, the drive magnet being attached to an outer circumferential side of the magnet holding member,
the impeller includes: a first blade member that is made of a resin and has an even number of four or more blades arranged at a constant pitch in a circumferential direction of the rotor; and a second blade member that is made of a resin, that is formed separately from the first blade member, and to which the first blade member is fixed,
an axial direction of the magnet holding member that is formed in the tubular shape matches an axial direction of the rotor,
when one side in the axial direction of the rotor is set as a first direction side, and an opposite side from the first direction side is set as a second direction side,
the second blade member is integrally formed with the magnet holding member by injection molding, and is formed in a flange shape that expands outward in a radial direction of the rotor from a first direction end of the magnet holding member,
a plurality of the blades is fixed to the first direction side of the second blade member,
a plurality of gate marks is formed on a surface on the first direction side of the second blade member, the plurality of gate marks being disposed on an outer side of an outer circumferential surface of a portion, which is connected to the second blade member, in the magnet holding member in the radial direction of the rotor and being arranged in the circumferential direction of the rotor,
each of the plural gate marks is formed at an intermediate position in the circumferential direction of the rotor between the two of the blades that are adjacent to each other in the circumferential direction of the rotor, and an even number of the blades are disposed between the gate marks in the circumferential direction of the rotor.

2. The pump apparatus according to claim 1, wherein the plurality of the gate marks is formed at the same position in the radial direction of the rotor.

3. The pump apparatus according to claim 1, wherein the plurality of the gate marks is each formed at an intermediate position of the second blade member in the radial direction of the rotor.

4. The pump apparatus according to claim 1, wherein the plurality of the gate marks is formed at a constant pitch in the circumferential direction of the rotor.

5. The pump apparatus according to claim 4, wherein the second blade member is formed with the gate marks, a number of which is half the number of the blades provided to the first blade member.

6. The pump apparatus according to claim 5, wherein the first blade member includes the blades in a quantity of 10 blades, and
the second blade member is formed with the gate marks in a quantity of 5 gate marks.

7. The pump apparatus according to claim 1, wherein the surface on the first direction side of the second blade member is formed with groove sections, into each of which an end portion on the second direction side of respective one of the plural blades is fitted, and
in a range on an outer side of the gate marks in the radial direction of the rotor, the end portion on the second direction side of each of the blades is fixed to the respective groove section by welding.

8. The pump apparatus according to claim 2, wherein the plurality of the gate marks is each formed at an intermediate position of the second blade member in the radial direction of the rotor.

9. The pump apparatus according to claim 2, wherein the plurality of the gate marks is formed at a constant pitch in the circumferential direction of the rotor.

10. The pump apparatus according to claim 9, wherein the second blade member is formed with the gate marks, a number of which is half the number of the blades provided to the first blade member.

11. The pump apparatus according to claim 10, wherein the first blade member includes the blades in a quantity of 10 blades, and
the second blade member is formed with the 5 gate marks in a quantity of 5 gate marks.

12. The pump apparatus according to claim 2, wherein the surface on the first direction side of the second blade member is formed with groove sections, into each of which an end portion on the second direction side of respective one of the plural blades is fitted, and
in a range on an outer side of the gate marks in the radial direction of the rotor, the end portion on the second direction side of each of the blades is fixed to the respective groove section by welding.

* * * * *